No. 854,107. PATENTED MAY 21, 1907.
A. PICK.
MAGNETIC CLUTCH.
APPLICATION FILED MAR. 6, 1905.

2 SHEETS—SHEET 1.

WITNESSES:
Henry E. Kirby
Joseph M. D'Arcy

INVENTOR
Alfred Pick
BY
E. W. Marshall
ATTORNEY

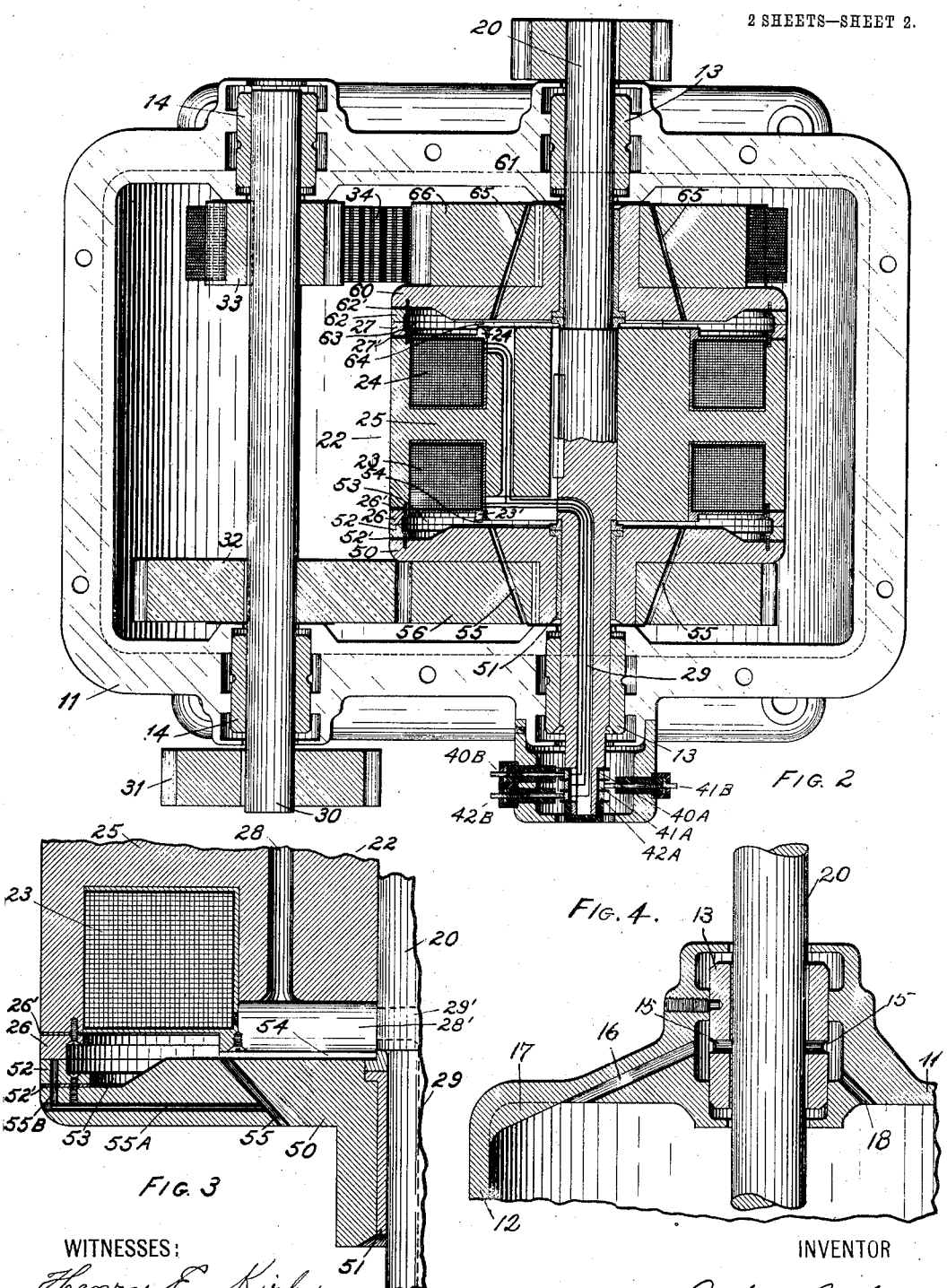

UNITED STATES PATENT OFFICE.

ALFRED PICK, OF YONKERS, NEW YORK, ASSIGNOR OF FIFTEEN ONE-HUNDREDTHS TO WILLIAM W. BUTLER, OF YONKERS, NEW YORK.

MAGNETIC CLUTCH.

No. 854,107.  Specification of Letters Patent.  Patented May 21, 1907.

Application filed March 6, 1905. Serial No. 248,650.

*To all whom it may concern:*

Be it known that I, ALFRED PICK, a subject of the Emperor of Austria, residing at Yonkers, in the county of Westchester and State of New York, United States of America, have invented certain new and useful Improvements in Magnetic Clutches, of which the following is a specification.

My invention relates to clutches which are operated electro-magnetically and its object is to provide a simple and efficient clutch of this type and one which will overcome the difficulties of those now in use.

I will describe in the following specification, a clutch made according to my invention and will point out the novel features thereof in claims.

Figure 1:
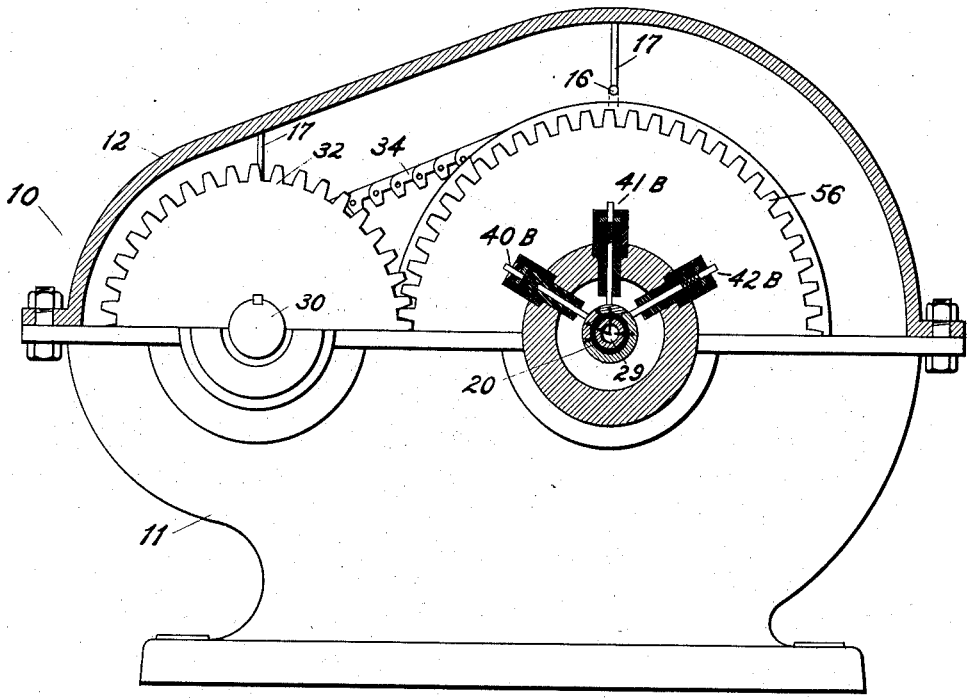
Figure 5:
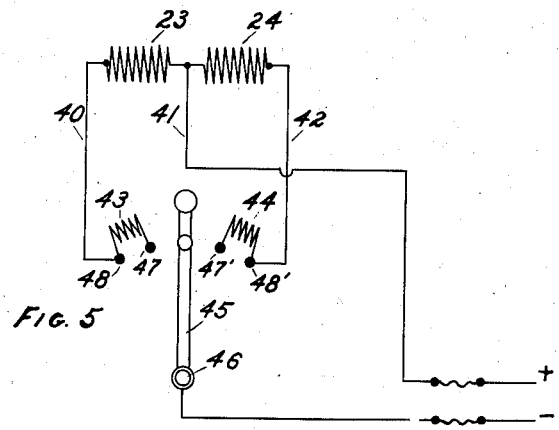

Referring to the drawings, Figure 1 is a side elevation, partly in section, of a clutch made according to my invention. Fig. 2 is a plan view, partly in section, of the same clutch with its cover removed. Fig. 3 is a sectional view of a portion of my clutch showing a detail of construction. Fig. 4 shows another detail of construction. Fig. 5 is a diagram showing a preferred system of electrical connections for my clutch.

Like characters of reference designate corresponding parts in all of the figures.

10 designates a casing for the clutch which comprises two parts: a base 11 and a cover 12. Two pairs of bushings 13, 13 and 14, 14 are supported in the base 11. A driven shaft 20 runs in the bushings 13, 13, and a driving shaft 30 runs in the bushings 14, 14.

A gear 31 may be rigidly attached to the driving shaft 30 and this gear may be connected to some suitable source of power. A magnet member 22 is attached to the shaft 20. This magnet member may be single or double. In Fig. 2 it is shown double, that is it is so shaped that it has two magnetic circuits and two clutch surfaces, as will be pointed out fully hereinafter. It comprises in this case two annular recesses in which are placed coils or windings 23, 24 of electrical conductors. These conductors are wound in such form that their coils encircle the axis of the shaft 20. The portion of the magnet member which is between the two windings 23, 24 forms a web 25 which I prefer to make of certain definite proportions in relation to the rest of the magnet member. Rings 26 and 27 of magnetic material are attached to the magnet member by screws or other suitable means in the position shown in the drawings, but are separated from direct contact with the magnet member by means of circular strips of non-magnetic material 26' and 27'. These rings 26 and 27 and the strips of non-magnetic material form a part of the magnet member 22. The windings 23 and 24 may be securely held in place by means of circular disks 23', 24' which may be held against the magnet member by means of screws as shown. Two holes 28 and 28' are shown in the magnet member for the purpose of providing conduits for the electrical conductors which lead from the windings 23 and 24. One end of the shaft 20 is drilled out, as shown at 29, to receive these conductors and this hole 29 is connected to the hole 28' by means of an opening 29' in the shaft. It will be noted that the magnet member 22 and its connected parts above described will rotate with the shaft 20. By arranging the holes 28 and 28' in the magnet member to join the hole 29 in the shaft, it is possible to have the hole in the shaft much shorter than it otherwise would be, which is a valuable feature of construction.

The electrical conductors above referred to, and which are designated in Fig. 5 by 40, 41 and 42 are led from the windings 23 and 24 through these holes or conduits and are connected to three collector rings 40A, 41A and 42A which are mounted upon one end of the shaft 20. These collector rings are suitably insulated from the shaft and from each other. Brushes 40B, 41B and 42B bear upon the collector rings 40A, 41A and 42A respectively and may be connected by wires or other suitable electrical conductors to any desired external circuits.

Referring now to Fig. 5 I will describe the circuits there shown. + and − designate a source of electrical supply. + is connected directly to the conductor 41 which as shown is connected to one terminal of both of the coils or windings 23 and 24. − is connected to a manually operated switch arm 45 which is pivoted at 46. This switch arm may be moved to the left or right at will. When moved to the left it first comes in contact with a stationary contact 47 and this completes a circuit through the coil 23 and a resistance 43. Upon a further movement of the switch arm to the left, it will come into contact with a stationary contact 48 and this will cause the resistance 43 to be cut out and the coil 23 to be connected directly across the source of supply. Similarly, a movement of the switch arm 45 to the right will cause the coil 24 to be connected to the source of supply, first through a resistance 44 and then directly. On the driven shaft 20 are two bushings 51 and 61, which are preferably of non-magnetic material such as bronze. These bushings support disks or armatures 50 and 60 of magnetic material such as soft iron. These bushings are loosely mounted upon the shaft so that they are free to rotate about the shaft 20. Near the outer edges of the armatures, rings 52, 62 of magnetic material are attached, with strips 52', 62' interposed between the rings and the main portion of the armature. These rings form the outer portion of the armatures and form friction surfaces which are adapted to be brought into contact with similar friction surfaces on the magnet member. Each armature is designed to complete a magnetic circuit through itself and one side of the magnet member 22, when the latter is energized. That portion of the armatures which lies directly inside of the rings 52, 62, is cut away as shown at 53, 63, so that the magnetic flux which passes through the friction surfaces is concentrated in that portion of the magnetic circuit in which the friction surfaces lie. The portion of the armatures which face the magnet member, except near their outer edge, is so shaped that they do not come in contact with the magnet member when the friction surfaces are together, but form air gaps 54, 64 as shown. This is an important feature of my design and its function will be pointed out later. A gear 56 is securely attached to the armature 50 and this meshes with another gear 32 which is securely attached to the driving shaft 30 and which may be made of bronze or other non-magnetic material. A chain or sprocket wheel 66 is securely attached to the other armature 60 and is connected by means of a chain 34 to a similar sprocket wheel 33 attached to the shaft 30. It is evident then, that when the driving shaft 30 is rotated that the armature 60 will be driven thereby in the same direction, and that the armature 50 will be driven thereby in the opposite direction. The rate of speed of the armatures may be made the same or greater or less than that of the shaft 30 by proportioning the gears or sprocket wheels to obtain the desired result. Oil channels 55, 55 are shown through the gear 56 and armature 50. The outer ends of these channels are nearer the axis of the shaft 20 than are their inner ends, which lead into the air space 54. In Fig. 3 other oil channels 55A and 55B are shown leading from the oil channel 55 directly to the friction surfaces between the armature 50 and the magnet member 22.

The casing 10 in which the various parts are arranged to run is adapted to be filled with oil. This insures liberal lubrication of the gears and is conducive of quietness of running of the apparatus. Some of the oil will enter the outer ends of the oil channels 55, 55 and will be thrown outward by centrifugal force when the parts are in motion. This will cause the oil to be carried under pressure thus obtained directly to the friction surfaces.

In Fig. 4 I have shown somewhat in detail a preferred form of lubricating the shaft bearings. Here one of the bushings 13 is shown with an oil hole 15 in it. Above this hole is shown another oil channel 16 in the upper part or cover 12 of the casing and directly above this channel is shown in section a flat web 17 which is also shown in Fig. 1. When the parts are in motion, some of the oil in the casing will be thrown against this web and will then drip down into the oil channel 16 which will carry it to the bushing 13. It will then run through the oil hole 15, lubricate the bearing and run out through a channel 18 in the lower part or base 12 of the casing.

I will now describe the operation of my magnetic clutch. We will assume that the shaft 30 is rotating and is driving the armatures 50 and 60 in opposite directions. Now if the switch arm 45 is moved to the left until it engages the stationary contact 47, a circuit will be completed as we have seen and a current of electricity will pass through the coil 23. This current will be limited by the resistance 43. This current will energize a part of the magnet member 22 and cause it to attract the armature 50. When the switch arm is moved over onto the contact 48, more current will pass through coil 23 and it will cause the attraction of the magnet member for the armature 50 to be greater. Therefore, by the use of the resistance 43 the magnetic attraction may be made gradually. The resistance 43 may if desired be divided up into a number of steps or it need not be used at all. When the magnet member and the armature 50 have been thus drawn together, the surfaces of the rings 26 and 52 will meet in a metallic frictional contact and magnet member 22 and the shaft 20 will then rotate with the driven armature 50 and the shaft 30. As the magnetic flux is concentrated through these friction surfaces and as these are situated near the outer edge of the magnet member and of the armature the greatest attraction and magnetic torque will be near this outer edge where of course it will have the greatest effect. The rings 26 and 52 are preferably made of iron and so are capable of considerable wear which is reduced to a minimum by my improved system of lubrication.

One of the principal advantages of a magnetic clutch made according to my invention is that it is self-demagnetizing. When the switch arm 45 is brought back to its central position and the current is thereby cut off from the coil 23, the demagnetizing force in the magnetic circuit is at once in action and this quickly destroys the residual magnetism in the magnet member and the armature. This is because of the peculiar construction and arrangement of parts which are designed in certain proportions to each other in order to provide a very un-homogeneous magnetic circuit. The web 25 is so proportioned that it will attain a state of considerable saturation. It will have then practically free magnetic poles near its ends on account of the change of magnetic density at these points. The magnetic circuit will have other practically free magnetic poles, two of which are at the air space 54 and others near the outer edge of the magnet member at the interruptions which the non-magnetic strips 26' and 52' make in the magnetic circuit. These free poles mutually acting upon each other create a de-magnetizing force which quickly destroys the residual magnetism when the magnetizing force is removed. Due to the degree of saturation in the web 25, its reluctance is increased, thus causing a difference of magnetic potential in the magnetic circuit between the ends of the web. This also has a de-magnetizing effect upon the circuit.

When the coil 24 is energized and de-energized, the action of the magnet member and the armature 60 will be similar to that already described, but in this case the magnet member and the shaft 20 will be rotated in the opposite direction.

When the clutch is made double as shown, the web 25 is still made of small enough cross sectional area to attain a considerable degree of saturation. If one side of the magnet member has been energized by an electric current passing through one of its coils it will attract the armature on that side. Now if the current is cut off from that coil and is sent through the other coil, the other armature will be attracted and the first released. This is because the web 25 is sufficiently saturated to prevent any more magnetic lines of force passing through it than those which pass to the side of the magnet member which is now energized, so that those on the other side are thus destroyed.

It will be noted that as there is no contact between the magnet member and the armatures except near their outer edges, all the pressure due to the magnetic pull between the magnet member and an armature will be concentrated at the friction surfaces where it will produce the most efficient driving effect.

I have shown and described metallic friction surfaces between the magnet bodies and the armature as this is a preferred construction. Other surfaces, such for example as notched surfaces, may be used if desired. Instead of the two armatures being so connected as to be driven in opposite directions as shown, they may if preferred be driven in the same direction at different speeds. These suggestions are made to show that my invention is capable of many modifications and I do not mean to confine myself to the exact construction herein shown and described as that is merely illustrative of my invention.

What I claim is:

1. In a magnetic clutch, a magnet member and an armature, means for energizing the magnet member, an unhomogeneous magnetic circuit through the magnet member and the armature comprising a part of comparatively small cross-sectional area, connected to parts of greater cross-sectional area, and an air gap, said magnetic circuit being so proportioned and arranged as to produce a de-magnetizing force which will act immediately upon cessation of the energizing means.

2. In a magnetic clutch, a rotating magnet member, means for energizing said member, an armature adapted to co-act with said member, and strips of non-magnetic material in the magnet member and in the armature near their outer edges.

3. In a magnetic clutch, a rotating magnet member, means for energizing said member, an armature adapted to co-act with said member, an inside air space between the inside faces of the magnet member and the armature, and strips of non-magnetic material in the magnet member and in the armature.

4. In a magnetic clutch, a rotating magnet member, means for energizing said member, an armature adapted to co-act with said member, and strips of non-magnetic material in the magnet member and in the armature, the whole so proportioned and arranged as to produce a de-magnetizing force which will act immediately upon cessation of the energizing means.

5. In a magnetic clutch, a rotating magnet member, means for energizing said member, an armature adapted to co-act with said member, an inside air space between the magnet member and the armature, and strips of non-magnetic material in the magnet member and in the armature, the whole so proportioned and arranged as to produce a de-magnetizing force which will act immediately upon cessation of the energizing means.

6. A self-de-magnetizing magnetic clutch comprising a rotating magnet member, a coil or winding in such member, an armature of magnetic material adapted to co-act with said magnet member, and strips of non-magnetic material in the magnet member and in the armature with a short section of magnetic material between them.

7. A self-demagnetizing magnetic clutch comprising a rotating magnet member, an armature adapted to be brought into contact with said member near its outer edge, and non-magnetic material in the magnet member and in the armature with a short section of magnetic material between them.

8. A self-de-magnetizing magnetic clutch comprising a rotating magnet member, an armature adapted to be brought into contact with said member near its outer edge, an inside air space between said magnet member and the armature, and non-magnetic material in the magnet member and in the armature.

9. In a magnetic clutch, the combination of a driven shaft, a magnet member attached thereto, an armature loosely mounted on the shaft, a driving shaft connected with the armature and strips of non-magnetic material in the magnet member and in the armature with a short section of magnetic material between them.

10. In a magnetic clutch, the combination of a shaft, a magnet member attached thereto, and two armatures loosely mounted on the shaft, either one of which may be brought into contact with the magnet member, and non-magnetic material in the magnet and in the armatures near their outer edges.

11. In a magnetic clutch, the combination of a shaft, a magnet member attached thereto, and two armatures loosely mounted on the shaft either one of which may be brought into contact with the magnet member near their outer poles and non-magnetic material in the magnet member and in the armature near their outer edges.

12. In a magnetic clutch, the combination of a shaft, a magnet member attached thereto, an armature loosely mounted on the shaft, a second shaft directly connected to said armature by means of gears, and another armature also loosely mounted on the shaft, indirectly connected to the second shaft by means of a chain.

13. In a magnetic clutch, the combination of a shaft, a magnet member attached thereto, an armature loosely mounted on the shaft, a second shaft directly connected to said armature by means of gears, and another armature also loosely mounted on the shaft, indirectly connected to the second shaft by means of a chain, and means for moving either armature into contact with the magnet member.

14. In a magnetic clutch, the combination of a shaft, a magnet member attached thereto, an armature loosely mounted on the shaft, a second shaft directly connected to said armature by means of gears, and another armature also loosely mounted on the shaft, indirectly connected to the second shaft by means of a chain, and means for moving either armature into contact with the magnet member near its outer edge.

15. In a magnetic clutch, a magnet member, armatures on either side of said member, means for magnetizing the magnet member, unhomogeneous magnetic circuits through the magnet member and armatures comprising a part of comparatively small cross-sectional area, connected to parts of greater cross-sectional area, and air gaps, said magnetic circuit being so proportioned and arranged as to produce a demagnetizing force which will act immediately upon cessation of the magnetizing means.

16. In a magnetic clutch, a magnet member, armatures on either side of said member, means for magnetizing the magnet member so that it will engage either one or the other of said armatures, unhomogeneous magnetic circuits through the magnet member and armatures comprising a part of comparatively small cross-sectional area, connected to parts of greater cross-sectional area, and air gaps, said magnetic circuit being so proportioned and arranged as to produce a demagnetizing force which will act immediately upon cessation of the magnetizing means.

17. In a magnetic clutch, a magnet member having two magnetic circuits, armatures on either side of the magnet member which complete the magnetic circuit, electrical means for energizing either of the magnetic circuits, and non-magnetic material in each magnetic circuit of the magnet member, said circuits having a plurality of free magnetic poles arranged to create demagnetizing forces in the circuits which will act immediately upon cessation of the electrical energizing means.

18. In a magnetic clutch, a magnet member having two magnetic circuits, armatures on either side of the magnet member which complete the magnetic circuit, electrical means for energizing either of the magnetic circuits, and non-magnetic material in the armatures near their outer edges, arranged to produce a plurality of free magnetic poles which will create a demagnetizing force which will act immediately upon cessation of the electrical energizing means.

19. In a magnetic clutch, the combination of an inclosing casing a magnet member having friction surfaces, armatures on either side of the magnet member arranged to coact with the friction surfaces, said armatures having oil channels leading to the friction surfaces, and means to supply these channels with oil under pressure from the casing.

20. In a magnetic clutch, the combination of an inclosing casing a magnet member having friction surfaces, armatures on either side of the magnet member arranged to coact with the friction surfaces, said armatures having oil channels leading to the friction surfaces, and means to supply these channels with oil under pressure from the casing, which pressure is obtained by centrifugal force.

21. In a magnetic clutch, the combination of a magnet member, coils or windings for said member, suitable electrical conductors for the coils, a source of electrical supply, armatures on either side of the magnet member arranged to co-act therewith, friction surfaces between the magnet member and the armatures, strips of non-magnetic material in the magnet member and in the armatures with a short section of magnetic material between them, which section includes the friction surfaces and manually operated means for connecting the coils to the electrical supply.

22. In a magnetic clutch, the combination of a magnet member, coils or windings for said member, suitable electrical conductors for the coils, a source of electrical supply, armatures on either side of the magnet member arranged to co-act therewith, friction surfaces between the magnet member and the armatures, strips of non-magnetic material in the magnet member and in the armatures with a short section of magnetic material between them, which section includes the friction surfaces and manually operated means for gradually energizing the coils.

23. In a magnetic clutch, the combination of a casing adapted to contain oil, bearings in the casing, a driving shaft and a driven shaft supported by said bearings, a magnetic member attached to the driven shaft, armatures on either side of said member arranged to transmit the motion of the driving shaft in one direction or the other to the driven shaft, oil channels in the casing and in the bearings, and webs in the casing above the oil channels.

24. In a magnetic clutch, the combination of a magnet member and an armature, friction surfaces between the magnet member and the armature, and strips of non-magnetic material in the magnet member and in the armature with a short section of magnetic material between them which section includes the friction surfaces.

25. In a magnetic clutch, the combination of a casing adapted to contain oil, bearings in the casing, a shaft supported by said bearings, a rotating member attached to the shaft, oil channels in the casing and in the bearings, and webs in the casing above the oil channels.

In witness whereof, I have hereunto signed my name in the presence of two subscribing witnesses.

ALFRED PICK.

Witnesses:
JOSEPH E. CAVANAUGH.
ERNEST W. MARSHALL.